US00RE41674E

(19) United States
(12) Reissued Patent
Sasaki et al.

(10) Patent Number: US RE41,674 E
(45) Date of Reissued Patent: Sep. 14, 2010

(54) COMPOSITE SENSOR FOR DOOR AND AUTOMATIC DOOR SYSTEM

(75) Inventors: Shigeaki Sasaki, Kobe (JP); Kenji Nishigaki, Kobe (JP); Yasutaka Kanda, Kobe (JP)

(73) Assignee: Nabtesco Corporation, Kobe, Hyogo-ken (JP)

(21) Appl. No.: 12/348,555

(22) Filed: Jan. 5, 2009

Related U.S. Patent Documents

Reissue of:
(64) Patent No.: 7,221,118
Issued: May 22, 2007
Appl. No.: 11/432,927
Filed: May 12, 2006

(30) Foreign Application Priority Data

May 27, 2005 (JP) ..... 2005-155776

(51) Int. Cl.
*H02P 1/00* (2006.01)

(52) U.S. Cl. ..... 318/282; 318/466; 318/286; 318/468; 49/26; 49/28; 340/545.1

(58) Field of Classification Search ..... 318/282, 318/286, 466, 468, 467; 49/26, 28; 340/545.1, 340/545.2, 545.3
See application file for complete search history.

(56) References Cited

U.S. PATENT DOCUMENTS 3,852,592 A 12/1974 Scoville et al.
4,317,117 A 2/1982 Chasek
4,530,077 A * 7/1985 Dorr ..... 367/140
4,577,437 A * 3/1986 Gionet et al.
4,779,240 A * 10/1988 Dorr
4,815,046 A * 3/1989 Dorr ..... 367/95
4,967,083 A 10/1990 Kornbrekke et al.
5,142,152 A * 8/1992 Boiucaner
5,569,888 A * 10/1996 Kamani et al.
5,914,655 A 6/1999 Clifton et al.
5,986,357 A * 11/1999 Myron et al. ..... 307/116
6,255,791 B1 * 7/2001 Ariav
6,344,642 B1 * 2/2002 Agam et al.
7,064,666 B2 6/2006 Sasaki et al.
2004/0160318 A1 * 8/2004 Sasaki et al. ..... 340/522

OTHER PUBLICATIONS

BEA ACTIV8 Three on User's Guide, 42.0166 / V2, Feb. 2004, pp. 1–8.
BEA ACTIV8 Three Technical Specification, 41.9768 / V1, Jan. 2004, 2 pages.
BEA ACTIV8 .3 Technical Specification, 41.9220 / V1, Apr. 2000, 2 pages.
BEA ACTIV8 Three Technical Specification, Sep. 28, 2002, www.beasensors.com.
BEA ACTIV8.3 motion sensor, product information, 2 pages.

* cited by examiner

*Primary Examiner*—Rina I Duda
(74) *Attorney, Agent, or Firm*—Duane Morris LLP

(57) ABSTRACT

A first area (16) for detecting an object is formed by a radio wave or an ultrasonic wave, and a second area (18) for detecting an object by means of light is formed near the first area (16). When an object is detected in the first area (16) approaching the second area (18), the second area (18) is enabled. When an object is detected in the first area (16) moving in the direction away from the second area (18), the second area (18) is disabled.

7 Claims, 7 Drawing Sheets

COMPOSITE SENSOR FOR DOOR AND AUTOMATIC DOOR SYSTEM

Matter enclosed in heavy brackets [ ] appears in the original patent but forms no part of this reissue specification; matter printed in italics indicates the additions made by reissue.

This invention relates to a composite sensor for use with a door, for sensing an object by the use of, for example, a radio wave and light in combination.

BACKGROUND OF THE INVENTION

An example of such composite sensor for use with a door (hereinafter referred to as composite door sensor) is disclosed in a catalogue of composite sensors available from B.E.A. Inc., entitled "ACTIV8.3". The composite door sensor disclosed in the catalogue includes a microwave transmitter-receiver unit and an infrared emitter-receiver unit in a single casing. A microwave is used to detect an object, e.g. a moving object or pedestrian moving toward a door. When a moving object is detected by the microwave, the door is opened. Infrared light is used to detect a moving object standing stationary in the vicinity of the door. As long as the object is being detected by the infrared light, the door is kept open. Thus, an accident of a moving object being caught in the door can be avoided, and the safety of the moving object can be secured.

Infrared light used in such composite sensor for a door system tends to be adversely affected by disturbances, such as rain and snow. Infrared light is reflected not only by human bodies but also by rain and snow. Therefore a prior art composite door sensor like the one described before would erroneously detect rainfall, snowfall, puddle after the rain, or snow on the ground as an object to be detected by the sensor (hereinafter sometimes referred to as relevant object), such as a pedestrian. This causes an erroneous operation of an automatic door to open the door in spite of absence of any relevant object.

An object of the present invention is to provide a composite sensor for a door system with reduced possibility of erroneous operation of the automatic door which would be caused by disturbances, such as rain and snow.

SUMMARY OF THE INVENTION

A composite door sensor according to a first aspect of the present invention forms a first area for detecting an object therein by means of a radio wave, for example, and a second area close to the first area for detecting an object therein by means of light. The composite door sensor includes a radio wave transmitter and receiver for forming the first area, and a light emitter and receiver for forming the second area. The light emitter and receiver may be an infrared-light emitter and receiver. The light emitter and receiver may be of reflection type, in which the light emitter emits infrared light and the light receiver receives a reflected version of the infrared light emitted by the light emitter. The first area may be formed at a location spaced from a door and detect an object moving toward the door, with the second area formed closer to the door to detect a stationary object standing still near the door. When an object is detected moving in the first area toward the second area, the second area is enabled, and when an object is detected moving in the first area in a direction away from the second area, the second area is disabled.

This composite door sensor is arranged such that the second area is enabled at a time when an object is detected moving in the first area toward the second area. Accordingly, since, even if snow or rain disturbing the light is present in the second area, the second area is kept disabled until an object in the first area begins to move toward the second area, no erroneous operation of the door is caused by rain or snow. Also, the second area is disabled when an object which has come through the second area into the first area is detected moving in the first area in the direction away from the second area, and, therefore, it is prevented that the second area is erroneously operated due to disturbances thereafter.

A composite door sensor according to a second aspect of the present invention forms a first area for detecting an object therein by means of a radio wave, for example, and a second area close to the first area for detecting an object therein by means of light. The composite door sensor includes a radio wave transmitter and receiver for forming the first area, and a light emitter and receiver for forming the second area. The light emitter and receiver may be an infrared light emitter and receiver. The light emitter and receiver may be of reflection type, in which the light emitter emits infrared light and the light receiver receives a reflected version of the infrared light emitted by the light emitter. The first area may be formed at a location spaced from a door and detect an object moving toward the door, with the second area formed closer to the door to detect a stationary object standing still near the door. When an object is detected in the first area moving in the direction away from the second area when an object is being detected in the second area, a parameter relating to the second area is changed. The parameter is one for use in detecting an object in the second area, for example.

Specifically, the parameter change may be a change of sensitivity of detection in the second area, or a change of a reference value for the second area to a value corresponding to an amount of received light, or a change of the second area to an area for detection of a moving object.

When an object is detected moving in the first area away from the second area, with an object being also detected in the second area, it is highly possible that erroneous detection is occurring in the second area. In such case, a parameter for the second area is changed to remove the erroneous operating condition, so that entering of an object into the second area occurring thereafter can be detected without fail.

An automatic door system is provided, which can respond to a sensor signal from any one of the above-described composite door sensor by opening and closing the door.

In any of the above-described composite door sensor, the detection in the first area may be based on a detection method other than using a radio wave. For example, another detecting technique for detecting presence of an object and a direction of movement of the object, such as an ultrasonic Doppler technique and a millimeter wave radar technique may be used.

DESCRIPTION OF EMBODIMENTS

Figure 1:
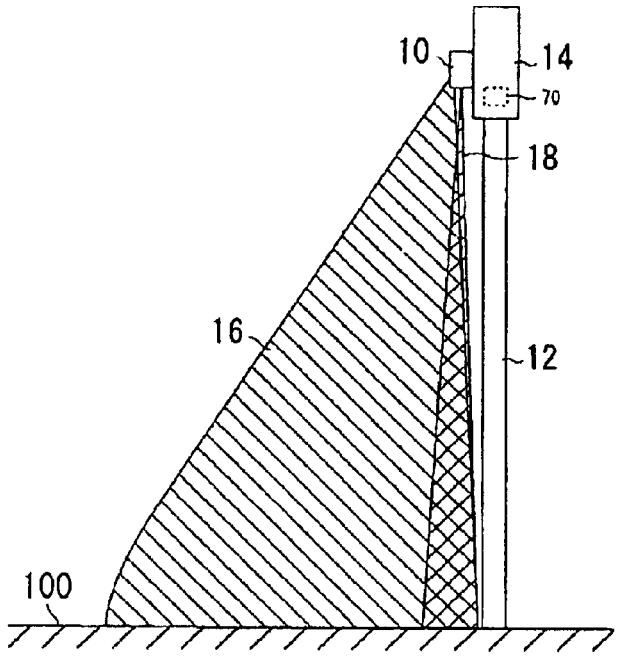
FIG. 1 is a side view of a composite sensor according to a first embodiment of the present invention used in an automatic door.

A composite sensor for use with a door according to a first embodiment of the invention is now described with reference to FIGS. 1 through 6. As shown in FIG. 1, the composite sensor 10 according to the first embodiment is mounted on a lintel 14 located above a door 12 of an automatic door system. The door 12 is a double sliding door, for example, as shown in FIG. 2.

Figure 2:
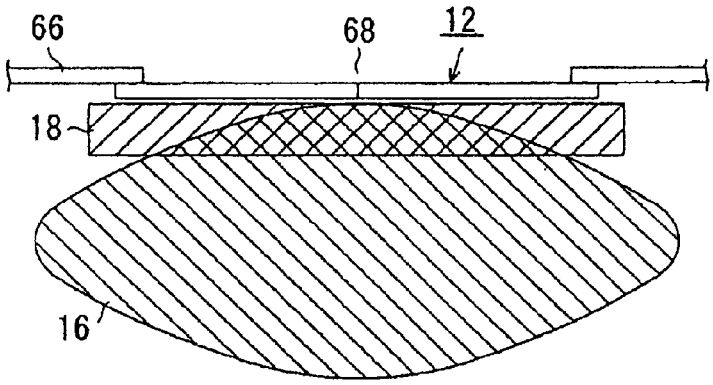
FIG. 2 illustrates detection areas provided by the composite sensor of FIG. 1.

The composite sensor 10 forms a first area 16 and a second area 18, as shown in FIGS. 1 and 2. The first area 16 is located at a location spaced from the front surface, for example, of the door 12, e.g. a location spaced in front of the door 12, i.e. leftward of the door 12 in FIG. 1 or downward of the door 12 in FIG. 2. The first area 16 is an area for detecting an object (not shown) moving toward the door 12, e.g. a pedestrian going to pass through the door 12. When an object is detected in the first area 16, a controller (not shown) causes the door 12 to be opened. Thus, the first area 16 functions as an activation area for initiating the opening operation of the door 12 by the controller.

The second area 18 is formed at a location nearer to and in front of the door 12, for example. The second area 18 is for detecting an object standing still in the vicinity of the door 12. When an object is detected in the second area while the door 12 is open, the controller causes the door 12 to be kept open. This prevents the object from being caught in the door 12. Thus, the second area 18 functions as a safety area for securing the safety of an object.

Figure 3:
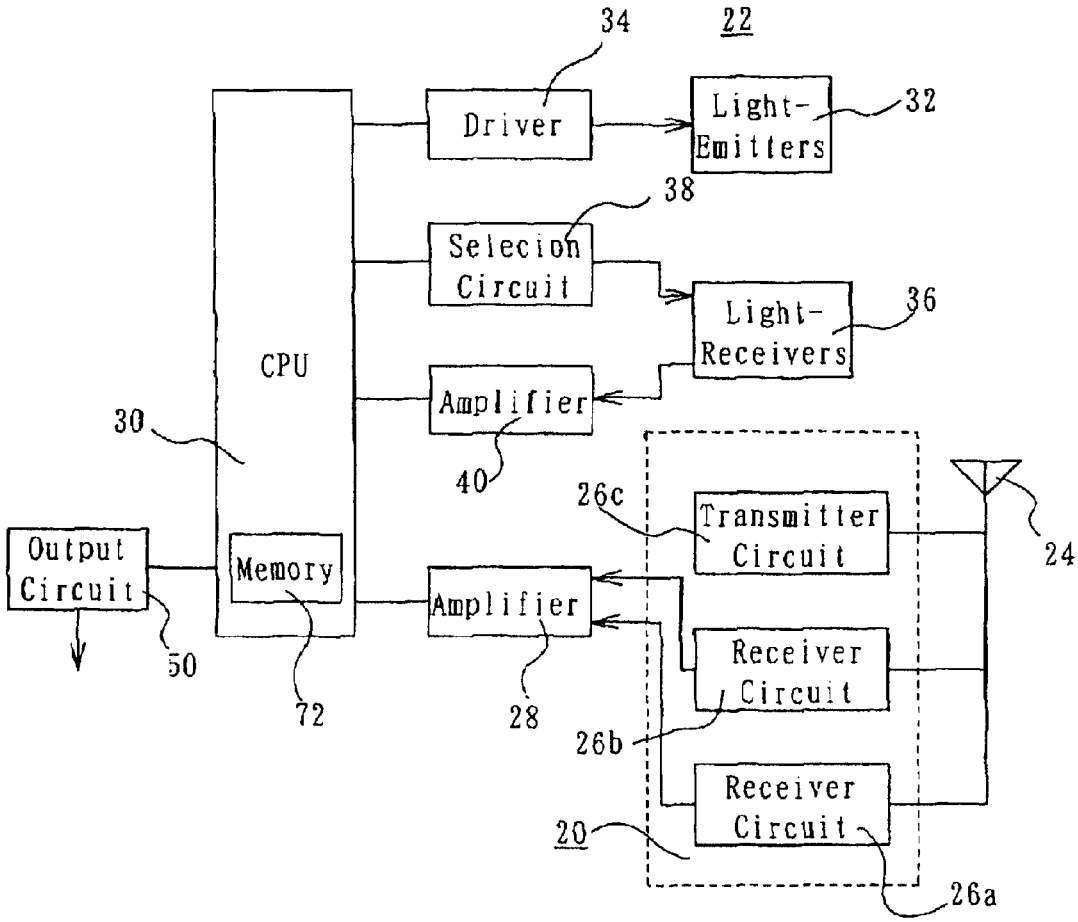
FIG. 3 is a block diagram of the composite sensor of FIG. 1.

In order to form the first and second areas 16 and 18, the composite sensor 10 includes a radio-wave transmitter-receiver module 20 and an infrared light emitter-receiver module 22, as shown in FIG. 3.

The radio-wave transmitter-receiver module 20 is for forming the first area 16, and includes an antenna 24, receiver circuits 24a and 24b, a transmitter circuit 26c and an amplifier circuit 28. The antenna 24 transmits a radio wave, e.g. a microwave having a frequency of 24.15 GHz, corresponding to a transmission signal from the transmitter circuit 26c, toward a floor 100. The transmitted radio wave is reflected by the floor or an object, if there, and the reflected radio wave is received by the antenna 24. The received signal is applied to the receiver circuits 26a and 26b, which are disposed, being spaced by a distance equal to a quarter of the wavelength of transmission signal in the direction perpendicular to the door 12. In other words, there is a difference in length, which is equal to a quarter wavelength, between transmission lines from the antenna 24 to the respective receiver circuits 26a and 26b.

When an object enters into the first area 16, the transmitted microwave or radio wave is reflected by the object, and the reflected wave is received by the antenna 24. A received wave representative signal from the antenna 24 is applied to the respective receiver circuits 26a and 26b. The receiver circuits 26a and 26b process the received wave representative signals in a predetermined manner, including demodulation of the signal. The signals from the receiver circuits 26a and 26b are amplified in the amplifier circuit 28 and, then, applied to a CPU 30.

Figure 4A:
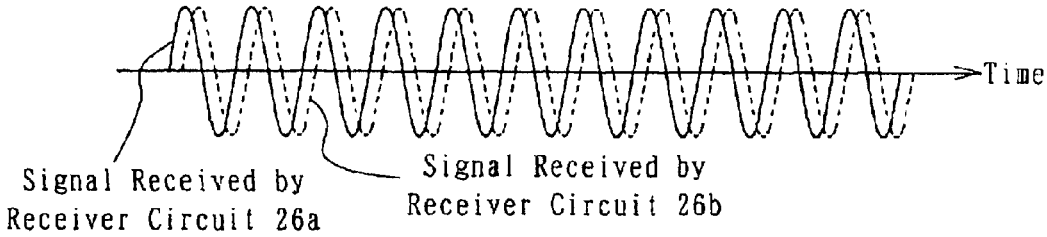
FIGS. 4A, 4B and 4C show signals as received by a radio wave transmitter-receiver module of the composite sensor of FIG. 1.
Figure 4B:
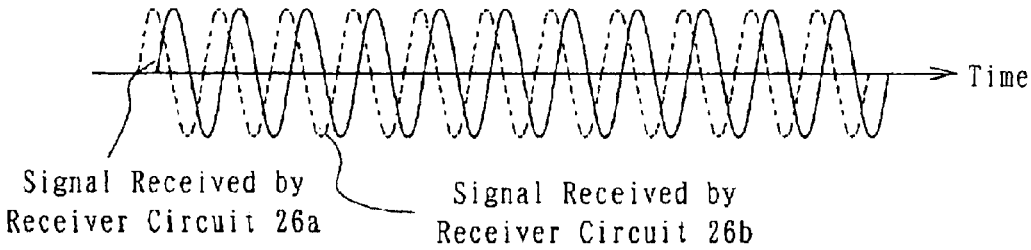
Figure 4C:
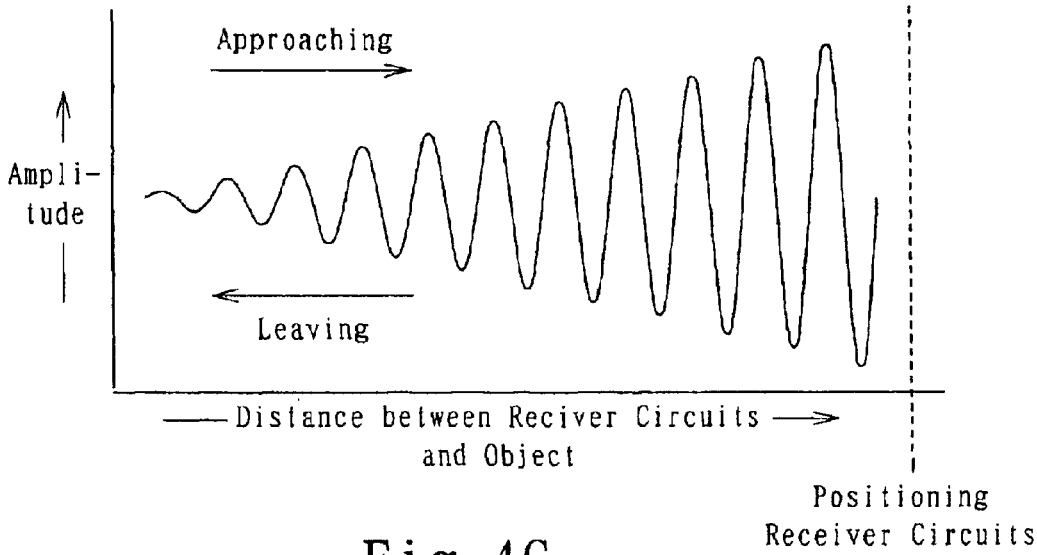

The phase relationship between the demodulated signals from the receiver circuits 26a and 26b when an objected is moving in the first area 16 toward the second area 18, or, in other words, moving toward the door 12, and the phase relationship between the demodulated signals when the object is moving in the first area 16 in the direction away from the second area 18, or the door 12, is different. For example, as shown in FIG. 4A, if the object is approaching the door 12, the phase of the signal from the receiver circuit 26b is delayed relative to the phase of the signal from the receiver circuit 26a. If the object is moving in the first area 16 leaving the door 12 behind, the phase of the signal from the receiver circuit 26b advances relative to the phase of signal from the receiver circuit 26a. In addition, the amplitudes of the signals from the receiver circuits 26a and 26b are small when the object is remote from the receiver circuits 26a and 26b and become larger as the object approaches the receiver circuits 26a and 26b, as shown in FIG. 4C.

Taking advantage of these phenomena, it can be judged that the object is approaching the door 12 when the phase of the signal from the receiver circuit 26a advances relative to that of the signal from the receiver circuit 26b and the amplitudes of the signals from the receiver circuits 26a and 26b are becoming larger. On the other hand, if the phase of the signal from the receiver circuit 26a delays relative to that of the signal from the receiver circuit 26b and the amplitudes of the signals from the receiver circuits 26a and 26b are becoming smaller, it can be judged that the object is moving, leaving the door 12 behind.

The infrared light emitter-receiver module 22 is for forming the second area 18 functioning as a safety area, and includes a set of light-emitting devices 32, a driver circuit 34, a set of light-receiving devices 36, a selection circuit 38 and an amplifier circuit 40.

Figure 5:
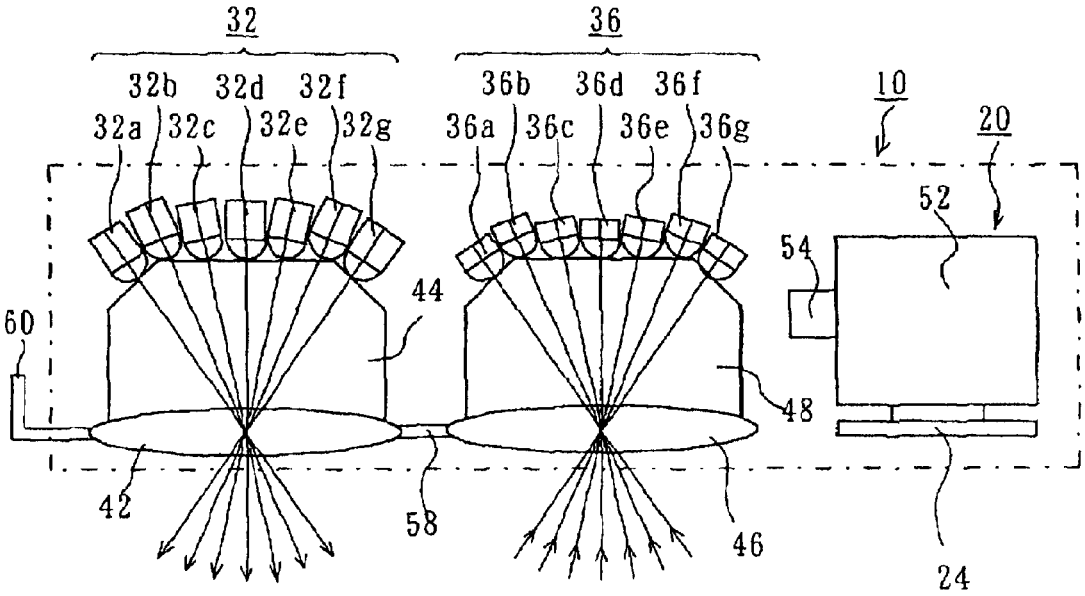
FIG. 5 illustrates how a light-emitting device set, light-receiving device set, and radio wave transmitter-receiver module of the composite sensor of FIG. 1 are disposed relative to each other.

The set of light-emitting devices 32 includes plural, e.g. seven, light emitting devices 32a through 32g, as shown in FIG. 5. FIG. 5 is a view of part of the composite sensor 10 seen from a location confronting the front surface of the door 12, i.e. from the left side in FIG. 1. The light-emitting devices 32a-32g are disposed in a plane extending in parallel with the front surface of the door 12 with the fronts thereof (i.e. the light-emitting centers) facing toward a point in a converging lens 42 disposed below the respective light-emitting devices 32a-32g. The light-emitting devices 32a-32g are respectively responsive to a driving signal supplied thereto from the driver circuit 34 to successively emit light one by one. The light may be infrared light within the near-infrared band. The infrared light is directed to the floor 100 through the converging lens 42. This results in the formation of the safety or second area 18 at a location near and along the door 12.

Reflecting means, e.g. a planar mirror 44, is fixed to the edge of the converging lens 42 on its side nearer to the door 12. The mirror 44 extends from the edge of the converging lens 42 toward the light-emitting devices 32a-32g. Part of the infrared light emitted from each of the light-emitting devices 32a-32g is reflected by the mirror and, then, passes through the converging lens 42 toward the floor 100. The part of the infrared light projected through the mirror 44 also contributes to the formation of the safety area 18.

When an object enters into the safety area 18, the infrared light is reflected by the object, and the reflected light is received by the light-receiving device set 36. More specifically, the light-receiving device set 36 is disposed by the light-emitting device set 32 (on its right hand side in FIG. 5), and includes seven light-receiving devices 36a through 36g, respectively corresponding to ones of the light-emitting devices 32a-32g of the light-emitting device set 32. Like the light-emitting devices 32a-32g, the light-receiving devices 36a-36g are disposed in a plane extending in parallel with the front surface of the door 12 with the fronts thereof facing toward a point in a converging lens 46 disposed below the respective light-receiving devices 36a-36g. The light-receiving devices 36a-36g are successively enabled one by one in synchronization with the light-emitting timing of the counterpart ones of the light-emitting devices 32a-32g, in response to a selection signal supplied thereto from the selection circuit 38. Thus, the infrared light emitted from the respective ones of the light-emitting devices 32a-32g and directed toward the floor 100 is reflected by an object, passes through the converging lens 46, and is received by the respective corresponding ones of the light-receiving devices 36a-36g.

A mirror 48 similar to the mirror 44 is secured to the edge of the converging lens 46 on its side nearer to the door 12. The mirror 48 directs reflected light from the portion of the safety area 18 expanded by the mirror 44, to the light-receiving devices 36a-36g.

The light-receiving devices 36a-36g convert reflected infrared light which they receive to electrical signals. The resulting electrical signals are amplified in the amplifier circuit 40 and, then, applied to the CPU 30. The light-receiving devices 36a-36g to which no selection signal is applied from the selection circuit 38 are disabled, and, therefore, even when they receive reflected light corresponding to the infrared light emitted from the corresponding ones of the light-emitting devices 32a-32g, they develop no output signals. The disablement of the light-receiving devices is effectuated in response to a signal supplied by the CPU 30.

The CPU 30 converts two demodulated signals supplied thereto from the amplifier circuit 28 of the radio-wave transmitter-receiver module 20, to digital signals, and judges the situation in the activation area 16, or, in other words, judges whether there is any object in the activation area 16, based on the resulting digital signals. The CPU 30 also converts the signals supplied thereto from the amplifier 40 of the infrared light emitter-receiver module 22 to digital signals, and judges the situation in the safety area 18 based on the resulting digital signals. When the CPU 30 judges that there is an object in at least one of the activation and safety areas 16 and 18, the CPU 30 outputs the judgment as the output signal (i.e. the sensor output) of the composite sensor 10 through the output circuit 50. The output signal is then applied to the previously mentioned controller, which opens the door 12 in accordance with the output signal. When the CPU 30 judges that there is no object in either of the activation and safety areas 16 and 18 after the door 12 is opened, the CPU 30 causes the sensor output to disappear and makes the controller operate to close the door 12.

The radio-wave transmitter-receiver module 20 is disposed beside the light-receiving device set 36, as shown in FIG. 5, with the antenna 24 facing toward the floor 100. An antenna angle adjusting knob 54 is on one side of a module case 52 for use in adjusting the direction in which the antenna 24 is directed.

The converging lenses 42 and 46 associated with the light-emitting device set 32 and the light-receiving set 36, respectively, are coupled together by means of a connecting rod 58. At one end of the connecting rod 58, an L-shaped lever 60 is attached. By handling the lever 60, the converging lenses 42 and 46 rotate about the connecting rod 58 functioning as a rotation axis. At the same time, the respective mirrors 44 and 48 also rotate about the connecting rod 58. As a result, the direction in which the infrared light projected via the mirrors 44 and 48 is directed changes to and fro with respect to the door 12, i.e. perpendicularly to the door 12.

As stated previously, infrared light in the near-infrared band is liable to be affected by disturbances such as rain and snow. If, therefore, rain or snow enters into the second or safety area 18, such rain or snow is sometimes detected as a relevant object. If such erroneous detection were reflected in the sensor output, the automatic door system would operate erroneously. For example, the door 12 would be opened despite the absence of any relevant object in the second area 18. In other case, the door 12 would be kept open even after a relevant object has passed through the door 12, due to the detection of rain or snow as a relevant object. In order to eliminate such erroneous operation, according to the first embodiment, the infrared light emitter-receiver module 22 is normally disabled, and is enabled when it is judged, from the properties of the previously described two demodulated signals, that an object is moving in the first area 16 toward the door 12.

A sequential operation of the CPU 30 to enable and disable the infrared light emitter-receiver module 22 is carried out in the following manner in accordance with a control program stored in a memory 72 of the CPU 30.

Figure 6:
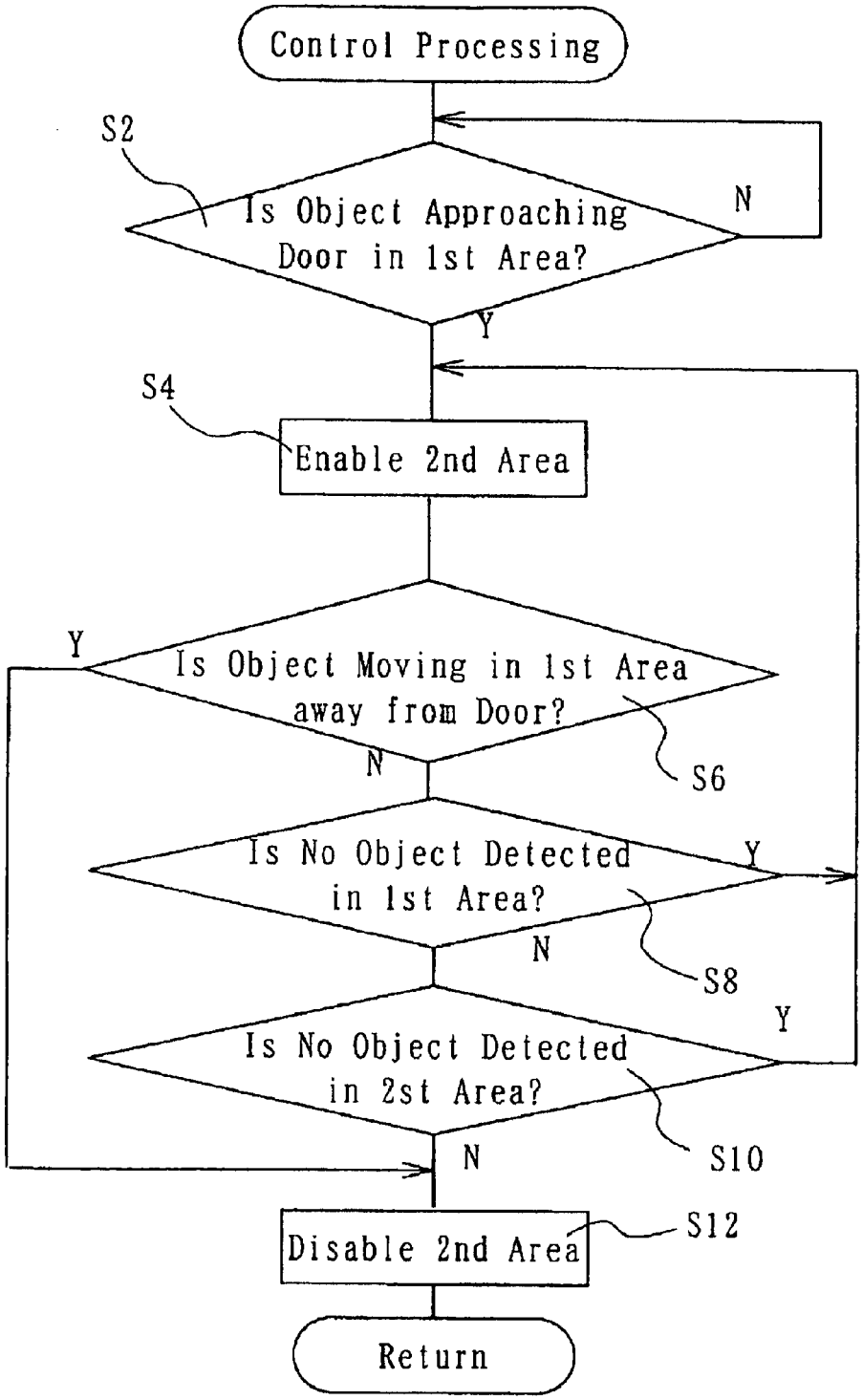
FIG. 6 is a flow chart of operation of the composite sensor of FIG. 1.

Referring to FIG. 6, whether any object is moving in the first area 16 toward the door 12 is judged (Step S2). If the answer to this query is NO, the processing of Step S2 is repeated until the answer becomes YES. When the answer to the query in Step S2 is YES, the second area 18 is enabled (Step S4). For example, the supply of the control signal from the selection circuit 38 is enabled. After that, a judgment is made as to whether the object is moving in the first area 16 away from the door 12 (Step S6). In other words, a judgment is made as to if the object has come through the open door 12 and the second area 18 into the first area 16 and is going out of the first area 16 away from the second area 18, or if the object which has been moving in the first area 16 toward the door 12 has turned its direction and is going away from the door 12. The answer of YES to this query means that the object is moving away from the door 12, and, then, the second area 18 is disabled (Step S12). When the answer to this query made in Step S6 is NO, a judgment is made as to whether no object is being detected in the first and second areas 16 and 18 (Step S8 and Step S10). The processing in Steps S4, S6, S8 and S10 is repeated and the second area 18 is kept enabled until the queries in both Step S8 and S10 become NO, or, in other words, no object is detected either in the first area 16 or in the second area 18. A predetermined time period after this, the second area 18 is disabled (Step S12), and the processing is ended.

By selectively enabling and disabling the second area 18, even when there is a layer of snow, for example, in the second area 18 near the door 12 and there is no relevant object in the second area 18, it never occurs that the layer of snow is detected by the infrared light emitter-receiver module 22, and, therefore, the door 12 is not opened. However, under such situation, if any object moves in the first area 16 toward the door 12, the infrared light emitter-receiver module 22 is enabled. Thus, it never happens that the door 12 is unnecessarily kept open.

Although not shown, another composite sensor similar to the composite sensor 10 may be installed on the opposite side of the door 12 to form activation and safety areas similar to the areas 16 and 18. In such a case, the both composite sensors may be controlled by a single CPU or may be connected together in such a manner as to communicate with each other, so that, when an object is moving in either one of the activation areas 16 toward the door 12, both infrared light emitter-receiver modules 22 can be enabled and that, when an object is detected moving in the activation area 16 away from the door 12, both infrared light emitter-receiver modules 22 can be disabled together, whereby the safety areas 18 are selectively enabled and disabled.

A composite sensor according to a second embodiment is the same in structure as the composite sensor 10 according to the first embodiment. Accordingly, the same reference numerals as used in the description of the composite sensor 10 according to the first embodiment are used in the following description of the composite sensor according to the second embodiment. According to the second embodiment, if the door 12 is kept open although an object which has moved through the second area 18 has entered into the first area 16 and is moving in the direction away from the door 12, which means that the infrared light emitter-receiver module 22 is making erroneous detection due to disturbance such as the presence of a rain puddle or a snow layer, a parameter of the infrared light emitter-receiver module 22 is changed. For example, a parameter used by the infrared light emitter-receiver module 22 in making a judgment as to whether there is a relevant object, is adjusted to release the infrared light emitter-receiver module 22 from the situation of erroneous detection.

Figure 7:
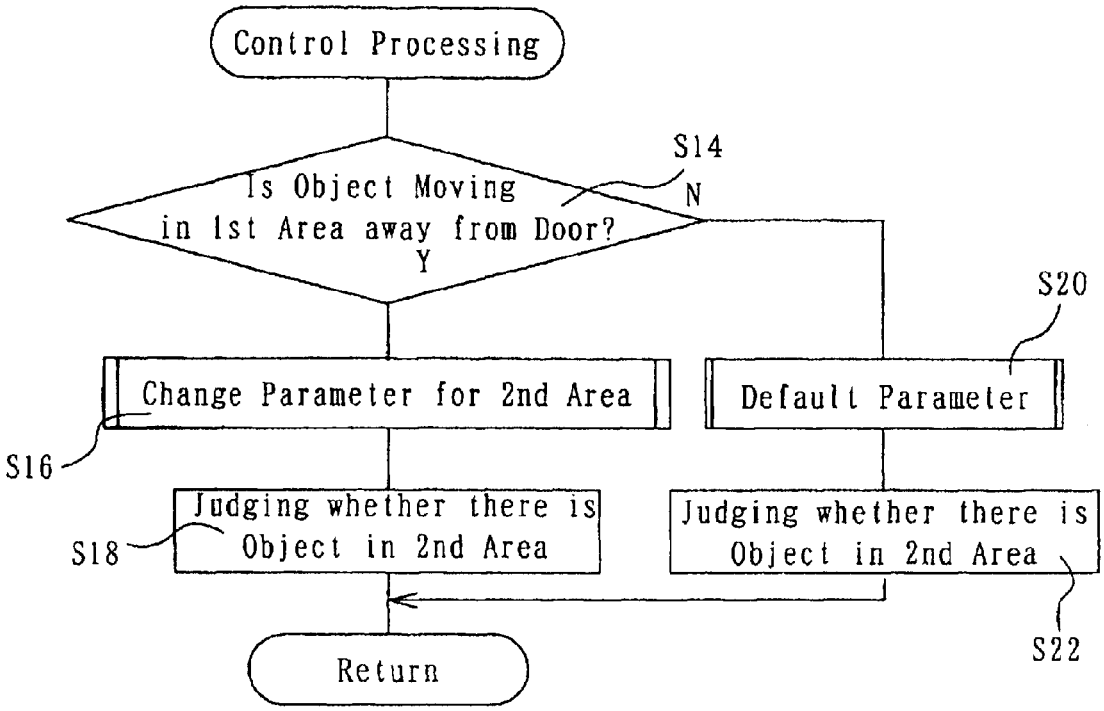
FIG. 7 is a flow chart of operation of a composite sensor according to a second embodiment of the present invention.

To achieve this, the CPU 30 performs processing as shown in FIG. 7. Now, let it be assumed that an object is coming toward the door 12 from the opposite or rear side of the door 12 and the door 12 is open. Under this circumstance, whether or not the object is moving in the first area 16 in the direction away from the door 12 is judged (Step S14). If the answer to this query is NO, a default parameter is used to judge whether the object is in tire second area 18 (Step S22). On the other hand, if the answer to the query in Step S14 is YES, it is highly probable that the object has passed the second area 18 and is moving in the first area 16 in the direction away from the door 12. There is a possibility that snow stuck on the soles of shoes may be left on a mat on the floor 100 and that such snow may be erroneously detected as a relevant object. Then, an infrared parameter relating to the infrared light emitter-receiver module 22 for the second area 18 is altered (Step S16) so that the infrared light emitter-receiver parameter 22 can correctly detect a relevant object in the second area 18 regardless of the presence of snow and the like. Whether there is an object in the second area 18 is judged (Step S18), using the altered parameter, and an output signal based on the result of the judgment is supplied through the output circuit 50 to the controller.

Figure 8A:
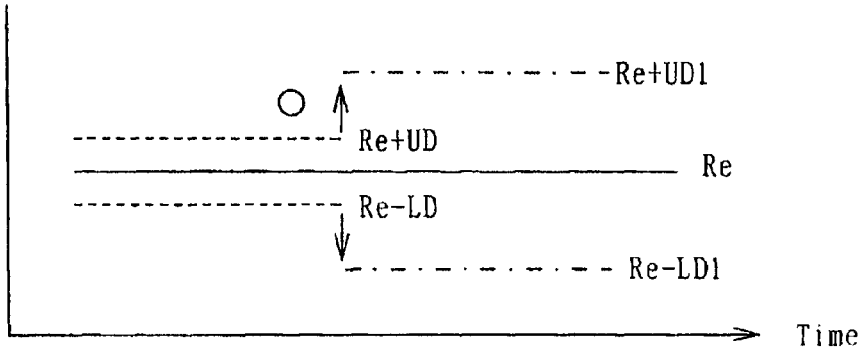
FIG. 8 exemplifies manners in which an infrared parameter of the composite sensor of FIG. 7 is changed.

An example of the parameter alteration is alteration of the sensitivity of the sensor, as shown in FIG. 8A. A reference value Re, an allowable upper limit deviation UD and an allowable lower limit deviation LD are determined beforehand. When a received light amount representative signal from a light-receiving device is outside a dead zone defined between the reference value Re plus the allowable upper limit deviation UD and the reference value Re minus the allowable lower limit deviation LD, it is judged that an object has been detected. If the received light amount representative signal is outside this dead zone, indicating that an object moving in the first area 16 in the direction away from the door is detected, in spite of the absence of the relevant object, which would be caused by, for example, the presence of a layer of snow, the allowable upper and lower limit deviations UD and LD are changed to UD1 and LD1, as shown, to widen the dead zone. This makes the received light amount representative signal influenced by the presence of snow enter into the dead zone, i.e. lowers the sensitivity of the infrared light emitter-receiver module 22, whereby erroneous detection is prevented.

Figure 8B:
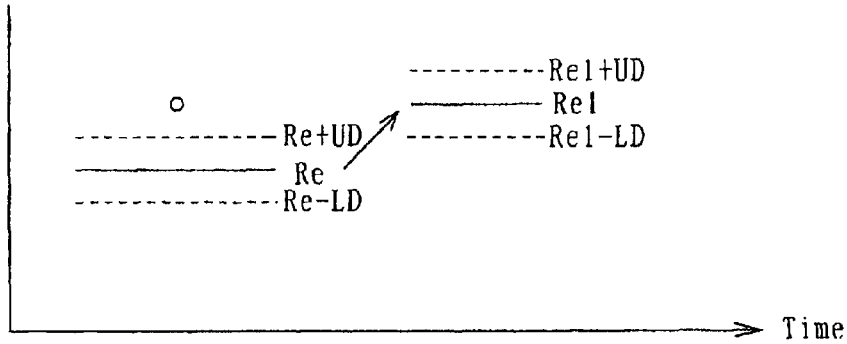

Another example of the parameter alteration is to alter a reference value as shown in FIG. 8B. In this case, too, a reference value Re, an allowable upper limit deviation UD, and an allowable lower limit deviation LD are determined previously. When a received light amount representative signal from a light receiving device falls outside a dead zone defined between the reference value Re plus the allowable upper limit deviation UD and the reference value Re minus the allowable lower limit deviation LD, it is judged that an object has been detected. In the absence of a relevant object, if the received light amount representative signal is outside the dead zone for a time longer than a predetermined time due to the presence of a layer of snow or the like, the value of the received light amount representative signal is used as a new reference value Re1. In this case, however, the allowable upper and lower limit deviations UD and LD are not changed. It should be noted, however, that, if the reason why the state in which the received light amount representative signal is outside the dead zone has continued for more than the predetermined time, is that the relevant object has stood still there, the object, which has started moving again, cannot be detected, because the reference value has been altered from Re to Re1. To cope with this problem, the previous reference value Re is stored after it has been changed to Re1 until it can be confirmed that the received light amount representative signals are stable for a predetermined time. If the value of the received light amount representative signal varies after the alteration of the reference value to Re1, the original reference value Re is used.

Figure 8C:
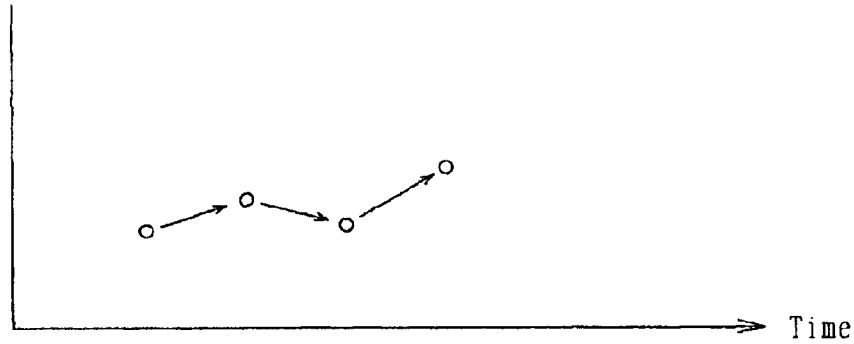

A third example of infrared light parameter change is to limit the detection in the second area 18 to the detection of only a moving object, as shown in FIG. 8C. When, an object passes through the second area 18 and moves in the first area in the direction away from the door 12, the detection in the second area 18 is performed by detecting a movement of the object. For example, it is judged that, when the amount of variations of the received light amount representative signal is more than a predetermined value, an object is present in the second area 18.

According to the first embodiment, the disablement of the infrared module 22 is done by interrupting the supply of a control signal from the selection circuit 38 to the set of light-receiving devices 36, but it may be done by making the light-emitting device set 32 stop emitting light. Furthermore, according to the first embodiment, whether an object is approaching the door 12 or leaving the door 12 in the first area 16 is judged based on both a phase difference between the two radio-frequency signals and changes in the amplitudes of the two signals, but it can be made based only on either the phase difference or the amplitude changes.

What is claimed is:

1. A composite sensor for use with a door, comprising:

radio wave or ultrasonic-wave detecting means for detecting the presence of an object and the direction of movement of the object in a first area along said door;

light detecting means for detecting a stationary object in a second area along and near said door;

enabling means for enabling, when said radio-wave or ultrasonic-wave detecting means detects an object approaching said door in said first area, said light detecting means to thereby make object detection in said second area possible; and disabling means for disabling, when said radio-wave or ultrasonic-wave detecting means detects the movement of the object in said first area away from said door with the object detection in said second area made possible, said light detecting means so as to disable object detection in said second area.

2. An automatic door system for selectively opening and closing a door in response to a signal representative of the result of detection by said composite sensor according to claim 1.

3. A composite sensor for use with a door, comprising:

radio wave or ultrasonic-wave detecting means for detecting the presence of an object and the direction of movement of the object in a first area along said door;

light detecting means for detecting a stationary object in a second area along and near said door; and a parameter adjusting means for changing a parameter relating to object detection by said light detecting means in such a manner that said light detecting means does not detect a stationary object when said radio-wave or ultrasonic-wave detecting means detects an object moving in said first area away from said door, when said door is open.

4. The composite sensor according to claim 3, wherein said parameter adjusting means lowers a sensitivity of said light detecting means.

5. The composite sensor according to claim 3, wherein said light detecting means judges that no object is present when a received light amount representative signal from said light detecting means is outside an allowable range determined for a predetermined reference signal, and said parameter adjusting means changes said reference signal to said received light amount representative signal.

[6. The composite sensor according to claim 3, wherein said light detecting means judges that no object is present when a received light amount representative signal from said light detecting means is outside an allowable range determined for a predetermined reference signal, and said parameter adjusting means changes said reference signal to said received light amount representative signal.]

7. An automatic door system for selectively opening and closing a door in response to a signal representative of the result of detection by said composite sensor according to claim 3.

*8. The composite sensor according to claim 3, wherein said parameter adjusting means changes detection control provided by said light detecting means to moving object detection, in which it is judged that an object is present when the amount of variations of said received light amount representative signal is more than a predetermined value.*

* * * * *